(12) United States Patent
Advani

(10) Patent No.: US 7,438,554 B2
(45) Date of Patent: Oct. 21, 2008

(54) MOTION APPARATUS WITH IMPROVED MOTION SPACE

(75) Inventor: Sunjoo Kan Advani, Breda (NL)

(73) Assignee: ADSE B.V., Hoofddorp (NL)

( * ) Notice: Subject to any disclaimer, the term of this patent is extended or adjusted under 35 U.S.C. 154(b) by 806 days.

(21) Appl. No.: 10/476,477

(22) PCT Filed: May 2, 2002

(86) PCT No.: PCT/NL02/00289

§ 371 (c)(1),
(2), (4) Date: Apr. 21, 2004

(87) PCT Pub. No.: WO02/089095

PCT Pub. Date: Nov. 7, 2002

(65) Prior Publication Data

US 2004/0180309 A1    Sep. 16, 2004

(30) Foreign Application Priority Data

| May 2, 2001 | (NL) | ..................................... 1017979 |
| Jan. 16, 2002 | (NL) | ..................................... 1019752 |

(51) Int. Cl.
*G09B 19/16* (2006.01)

(52) U.S. Cl. ..................................... 434/55

(58) Field of Classification Search ............... 434/30, 434/37, 38, 55, 58, 59, 61, 62, 67; 472/60
See application file for complete search history.

(56) References Cited

U.S. PATENT DOCUMENTS

| 3,577,659 | A | * | 5/1971 | Kail ............................. 434/58 |
| 4,343,610 | A | * | 8/1982 | Chou ............................ 434/58 |
| 5,179,525 | A | | 1/1993 | Griffis et al. | |
| 5,545,040 | A | * | 8/1996 | Lu ............................... 434/58 |
| 5,597,359 | A | * | 1/1997 | Byerly .......................... 472/60 |
| 5,605,462 | A | * | 2/1997 | Denne .......................... 434/55 |
| 5,829,982 | A | * | 11/1998 | Advani et al. .................. 434/58 |
| 5,857,917 | A | * | 1/1999 | Francis et al. .................. 472/60 |

(Continued)

FOREIGN PATENT DOCUMENTS

WO    WO 99/08253    2/1999

(Continued)

OTHER PUBLICATIONS

Advani et al, "Optimization of Six-Degrees-of-Freedom Motion Systems for Flight Simulator", Journal of Aircraft, vol. 36, No. 5, Sep.-Oct. 1999, pp. 819-826.

(Continued)

*Primary Examiner*—Kurt Fernstrom
(74) *Attorney, Agent, or Firm*—Michaelson & Associates; Peter L. Michaelson

(57) ABSTRACT

A motion simulator, comprising a platform carried by at least three pairs of length-adjustable legs, wherein the connection between each leg and the platform comprises a first coupling, wherein the distance between the first coupling of one pair of legs is smaller than the distance between the first coupling of different pairs, wherein, viewed in the top plan view, at least two first couplings are located on a first circle and at least two further first couplings on a second circle, wherein the first and the second circle are concentric and have a different radius.

19 Claims, 4 Drawing Sheets

U.S. PATENT DOCUMENTS

Figure 1:
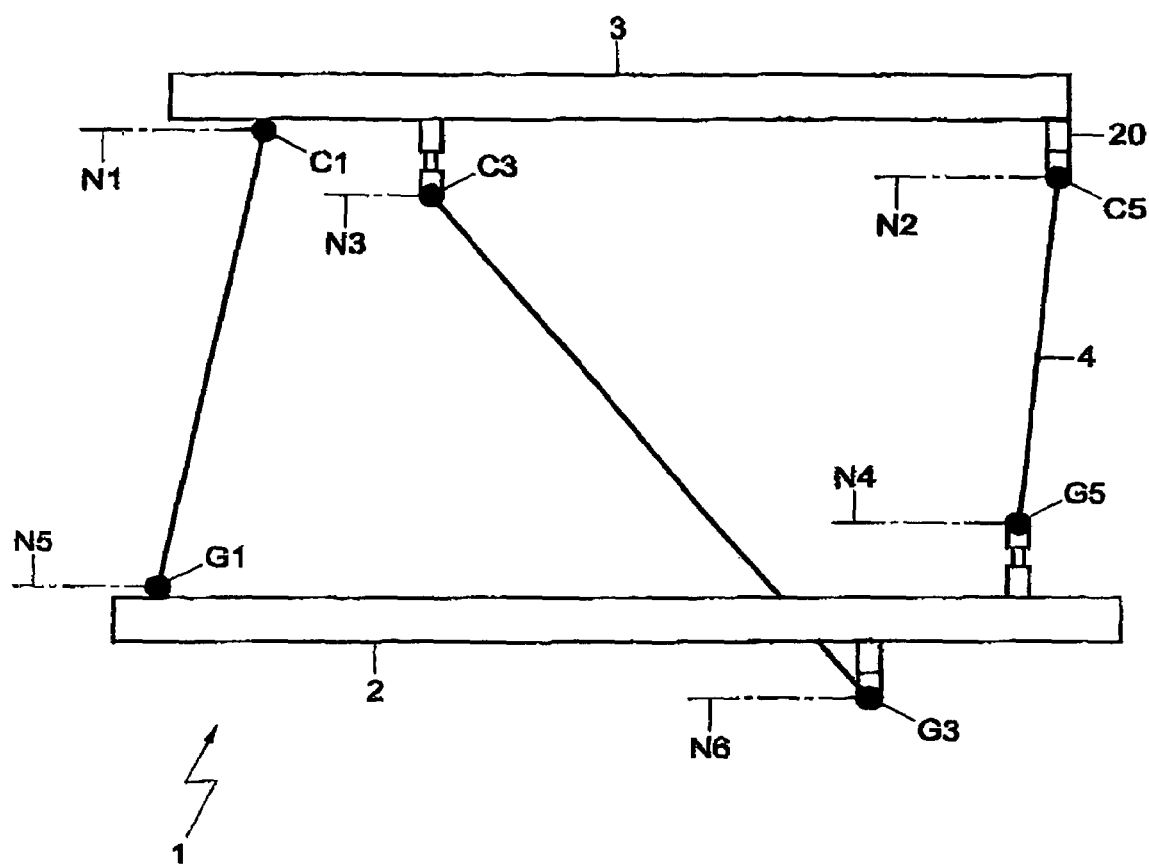

| | | | | |
|---|---|---|---|---|
| 5,865,624 | A * | 2/1999 | Hayashigawa | 434/66 |
| 5,872,438 | A * | 2/1999 | Roston | 318/568.11 |
| 5,975,907 | A * | 11/1999 | Advani | 434/29 |
| 6,210,164 | B1 * | 4/2001 | Otto | 434/55 |
| 6,396,462 | B1 * | 5/2002 | Mead et al. | 345/7 |
| 6,634,885 | B2 * | 10/2003 | Hodgetts et al. | 434/55 |

FOREIGN PATENT DOCUMENTS

WO    WO 02/089095    11/2002

OTHER PUBLICATIONS

Schneider, "Motion Bases are Ready for Careers in Entertainment", Hydraulics & Pneumatics, Jul. 1998, pp. 6 and 8.

* cited by examiner

MOTION APPARATUS WITH IMPROVED MOTION SPACE

The invention relates to a motion apparatus. In particular, the invention relates to a motion apparatus provided with six length-adjustable legs. Such a motion apparatus is known as Stewart platform and is, for example, described by D. Stewart, "A platform with six degrees of freedom", The institution of mechanical engineers, Proceedings 1965-66, volume 180, part 1, number 15.

In the known Stewart platform, six legs of equal length and equal adjustability are used, which are connected by first, upper couplings to the platform and by second, lower couplings to a base plate. The legs are arranged in three pairs, while, of each pair, the first couplings are arranged closely together, forming three pairs of first couplings, which pairs are evenly distributed over an imaginary circle. The second couplings of two legs lying side by side and relatively close together again form three pairs of couplings, which are also evenly distributed over an imaginary circle. Thus, a symmetrical motion platform is obtained, the centre of the platform having a symmetrical motion envelope. This means that in the motion envelope, no main direction of movement can be indicated.

It has already been suggested to place the first and/or second couplings on an imaginary ellipse (Sunjoo K. Advani). The angle, included between the different pairs of first and second couplings, respectively, can then be chosen to be different than 120°. Thus, already, a more advantageous motion envelope is obtained It has been found that with these known motion apparatuses no optimal motion envelope is obtained. This is, inter alia, limited by the length and adjustability of the legs, but also because there is the risk of the legs coming into contact with each other and/or the platform.

The invention has for its object to provide a motion apparatus of the type described in the opening paragraph, wherein the drawbacks mentioned are obviated while maintaining its advantages. To that end, a motion apparatus according to the invention is characterized by the features of claim 1.

In a motion apparatus according to the present invention, at least the first couplings of three pairs of legs are arranged pair-wise, such that at least two first couplings are located on a first circle, at least two first couplings on a second circle, concentric with the first circle, which circles are not identical to each other. Preferably, two first couplings, in particular a first pair of first couplings, are on the first circle, the other first couplings on the second circle.

Herein, the circles and ellipses, to be discussed later, are understood to be viewed in top plan view of the motion apparatus during use, with the platform substantially horizontal, at least in a middle position.

By arranging the first couplings on two different, concentric circles, the advantage is achieved that a motion apparatus is obtained having a motion envelope, i.e., adjustment range, which is particularly well suited to a desired, possible motion pattern for simulating all sorts of different vehicles, such as airplanes, cars and the like. In particular, thus, legs are prevented from coming into contact with each other and the platform before desired limits of the motion envelope have been reached. Moreover, thus, the dexterity is minimized.

In further elaboration, the first couplings are located on two ellipses, which ellipses preferably have major axes intersecting at a substantially right angle, while, preferably, the major axis of one of the ellipses extends between two first couplings of one pair of legs. Thus, the advantage is achieved that the legs can move one along the other relatively easily, in particular also at movements of the platform approximately along the major axis of one of the two ellipses, in particular along the major axis of that ellipse which extends between the coupling elements of the pair mentioned.

In an alternative embodiment, two first couplings are located on the first circle, in particular one pair, while, each time, a first coupling of the further two pairs of first couplings is located on the second circle, and the second first couplings of the respective pairs are located on a first and second line, respectively, which extends through the other first coupling of the respective pair of first couplings, which first or second line, respectively, includes an angle with the tangent at the location at the second circle. Through a suitable combination of, on the one hand, an angle between a line from the centre of the concentric circles at the middle between the first couplings of the pairs whose first coupling is located on the second circle and a line through the first couplings located on the second circle, and on the other hand, the angle included between said tangent and the first and second line, respectively, a still further improved, at least adapted motion envelope can be obtained. The angles mentioned can simply be chosen on the basis of the desired motion envelopes.

The first couplings can all be located in one plane, but are preferably located in different planes, while, also within first pairs of couplings, the first couplings can be moved in vertical and/or horizontal direction relative to each other. Thus, in an even simpler manner, legs are prevented from coming into contact with each other before the desired limits of the motion envelope have been reached.

In addition to the afore-described positioning of the first couplings, a similar or comparable positioning of second couplings for the bottom ends of the legs on the base plate can be chosen. The second couplings also can be located on at least concentric circles and/or ellipses, comparable to the first couplings. The second coupling are then located on at least a third and fourth circle, which circles are concentric and preferably approximately equal to or larger than the first and/or second circles.

In a motion apparatus according to the present invention, the lengths of the legs and/or adjustment ranges can be selected to be different, while, with each leg in a middle position, the centre of the platform (the geographic centre between the six first couplings, to be indicated, viewed in top plan view, as kinematic centroid) can be moved relative to the geographic centre between the second couplings. Also, the centre of the concentric first and second circles can, in top plan view, be moved relative to the centre of the concentric third and fourth circles. Thus, an adjustment range of a platform can be even further optimized. When manufacturing a motion apparatus according to the present invention, on the basis of an analysis of motions (in normal and extreme cases) of a vehicle to be simulated, such as a plane, car or the like, leg lengths can be determined, preferably experimentally or by computer simulations, while, moreover, suitable platform sizes are determined. On the basis thereof, a desired optimal motion envelope is determined, whereupon, for each of the first couplings and second couplings the optimal location is calculated with the aid of a computer and simulation program, while each leg is optimized in length and adjustment range. In such a manner, for each vehicle an optimal motion apparatus can be obtained, while legs are prevented from moving against each other in each others motion envelopes before limits of the necessary motion envelopes are reached.

In a particularly simple embodiment, couplings are provided such as ball and socket joints, at least cardan hinges (gimbals), while, each time, a pair of couplings is included in a joint housing. The ball and socket joints are adjustable within the housing in a simple manner, so that the location of the respective couplings in the pair can be adjusted in a simple manner. To that end, for instance filler blocks, suitable clamping means, screw means or the like can be used.

In a further advantageous embodiment, the position of one or more couplings (gimbals) is adjustable relative to one or more further couplings in the same or a different pair. Preferably, setting is also possible during use. Herewith, actively, the or each motion envelope of the motion apparatus can be set and adjusted, while the centre can be moved.

Herein, a motion apparatus is understood to include at least a movement simulator, a robot platform, a motion apparatus for use in telerobotic surgery and the like.

Figure 2:
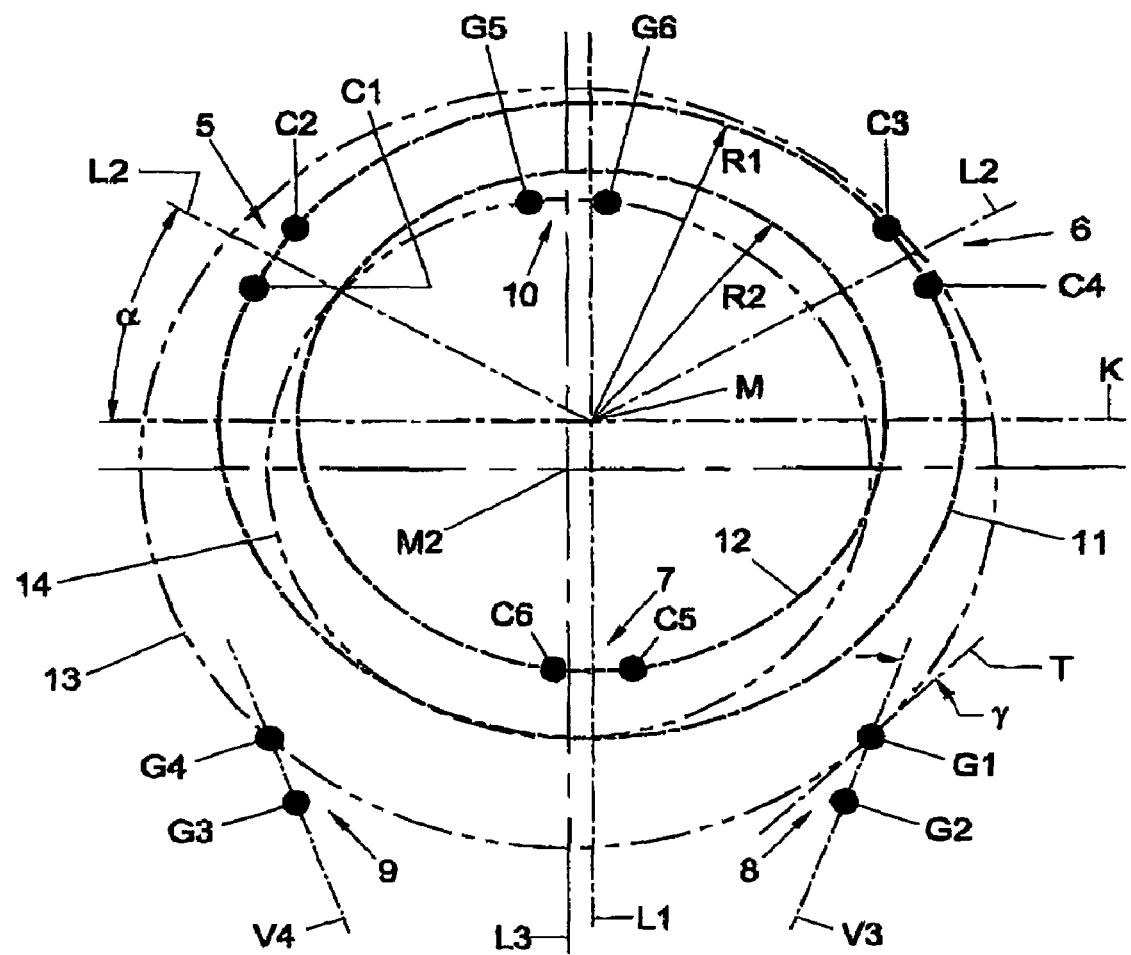
Figure 3:
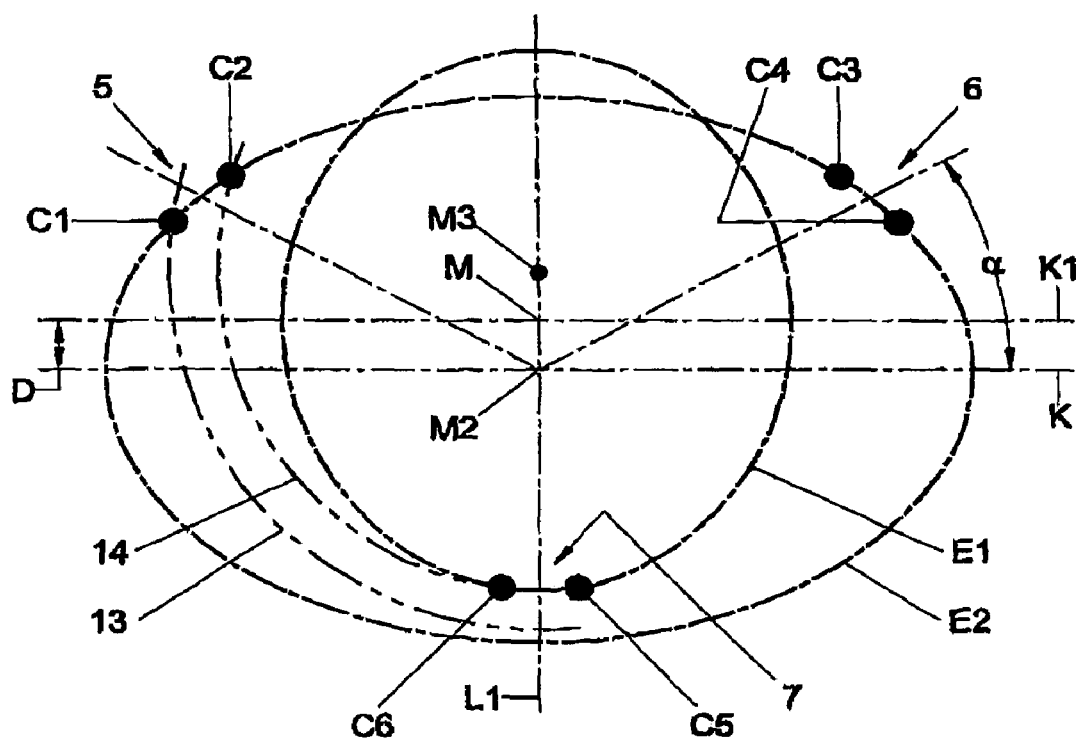
Figure 4:
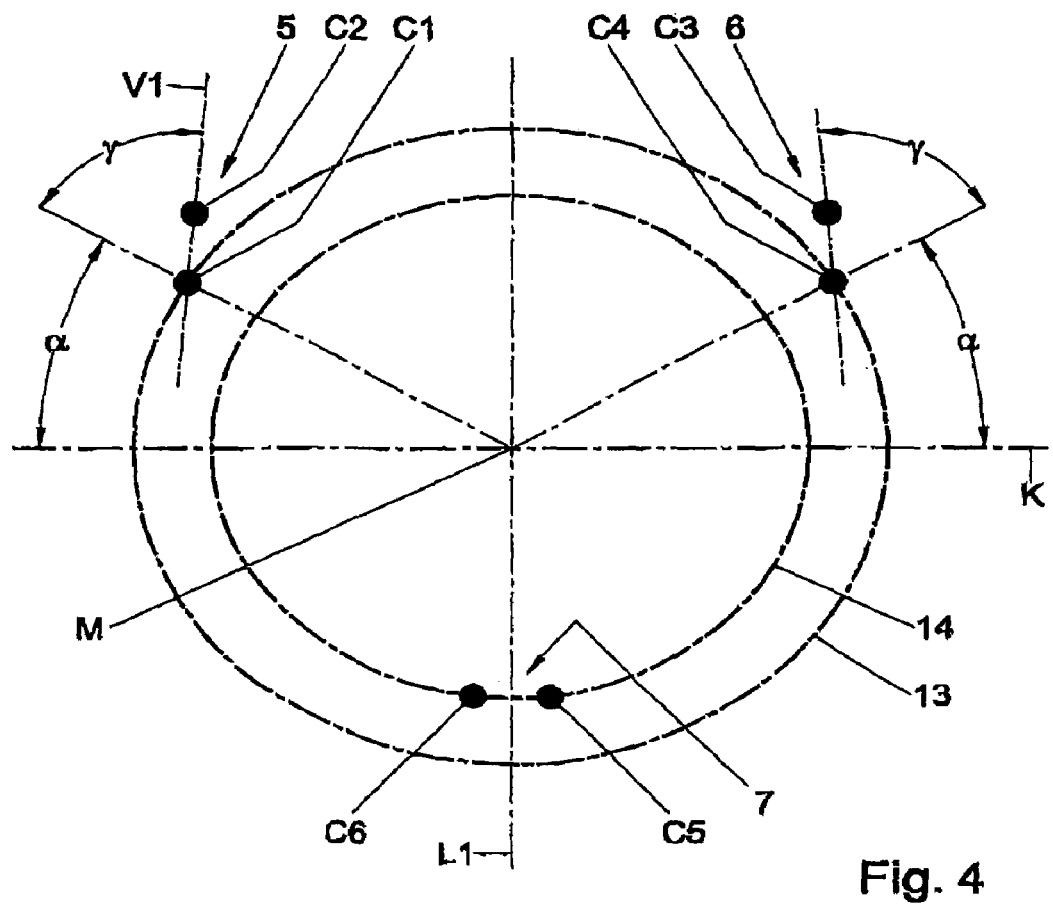
Figure 5:
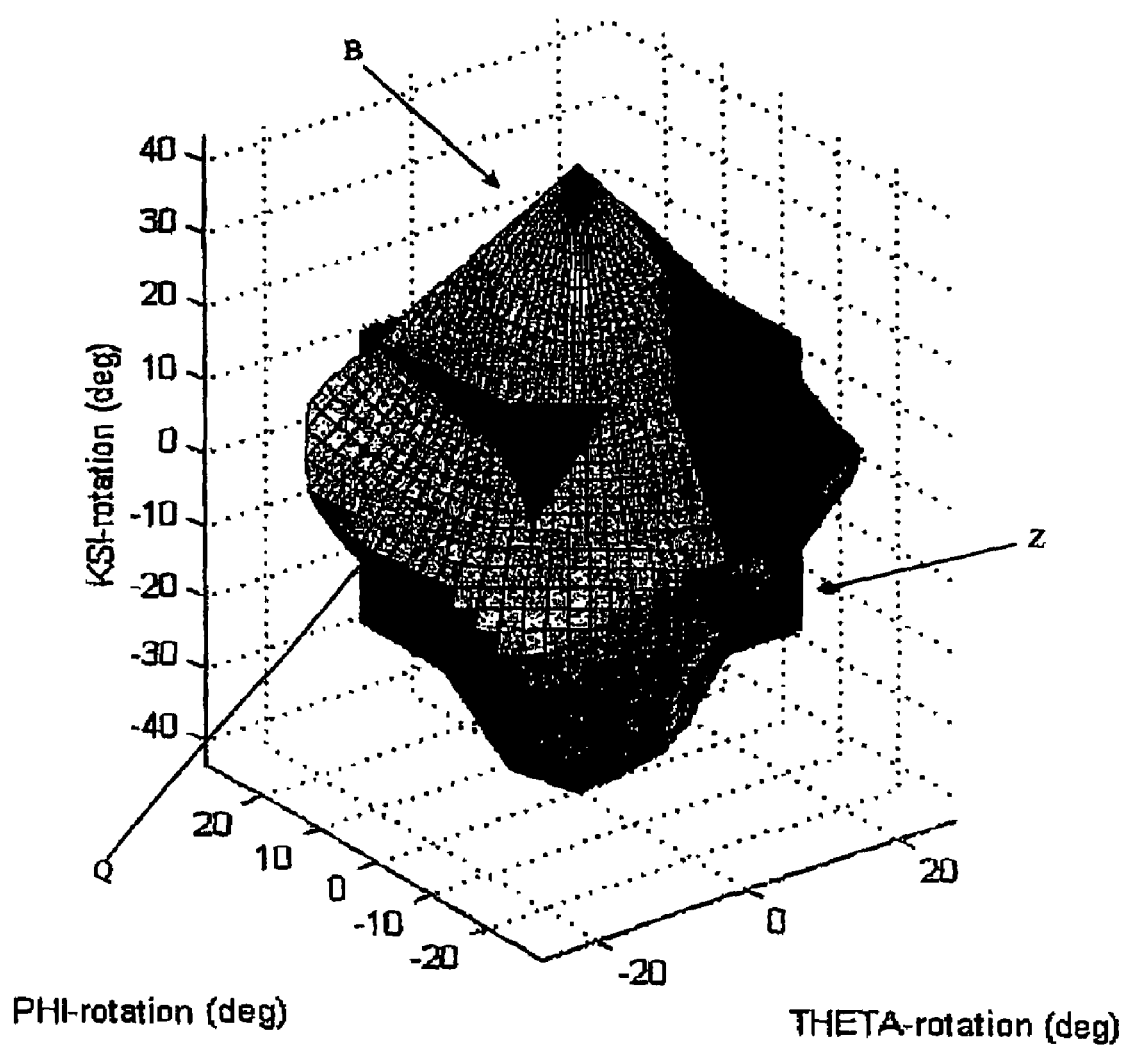

In the subclaims, further advantageous embodiments of a motion apparatus according to the invention are represented. In explanation, exemplary embodiments of a motion apparatus in the form of a motion simulator according to the invention will be further elucidated with reference to the drawing. In the drawing:

FIG. 1 schematically shows, in side view, a motion simulator according to the present invention;

FIG. 2 shows, in top plan view, a first arrangement of first and/or second couplings of a motion simulation according to FIG. 1;

FIG. 3 schematically shows, the arrangement of first and/or second couplings in a first alternative embodiment;

FIG. 4 shows an arrangement of first and/or second couplings in a second alternative embodiment; and FIG. 5 shows a graph of a motion envelope obtained with a motion simulator according to the present invention, wherein the three Euler angles psi, theta and phi are shown of yaw, pitch and roll of the platform, respectively, relatively to the axis system of the fixed world.

In this description, identical or corresponding parts have identical or corresponding reference numerals. In this drawing, in FIGS. 2-4, the location is indicated of first coupling means on a first and second circle and on a first and second ellipse. As to the second coupling means, the bottom ends of the legs, the same drawings can be given, wherein, however, the first circle is replaced by a third circle, preferably approximately identical to or larger than the first circle, and the second circle is replaced by a fourth circle, approximately as large as or larger than the second circle. The position of the three pairs of second couplings will then, for instance, be mirrored along the line K extending in the drawing horizontally through the centre M of the circles. However, the included angles may be different For simplicity's sake, by way of illustration, only in FIG. 2 such a third and fourth circle have been drawn. Naturally, in the same or a comparable manner third and fourth circles can be provided in the further embodiments. The second couplings can, for that matter, also be situated on one (third) circle. The legs can have the same or different lengths.

In FIG. 1, in schematic side view, a simulator 1 according to the invention is shown, comprising a base plate 2, a platform 3 and a series of legs 4, three of which have been drawn. The legs 4 are shown as drawn, straight lines, yet it will be clear that they are length-adjustable, for instance hydraulically, electromechanically or pneumatically, or have adjustable piston cylinder assemblies or screw spindles or the like. Such length-adjustable legs are known per se from practice, for instance from the Stewart platform mentioned. The legs 4 are connected to the platform 3 in six first couplings C1-C6, while the bottom ends are connected to the base plate 2 by second couplings G1-G6. As is apparent from FIG. 1, the different couplings C1-C6, G1-G6 are at different levels N1-N6, measured above or under the base plate 2 with the platform in a middle position, for instance a horizontal position as shown in FIG. 1. The middle position is for instance determined by adjusting all legs 4 at an average length.

In FIGS. 2-4, the positions of the first and/or second couplings C1-C6, G1-G6 are shown, in top plan view, i.e. at right angles to the base plate 2 with the platform 3 in the middle position. It will be clear that in the middle position, the platform 3 can also be inclined, for instance in that the edge of the platform shown in FIG. 1 at the left hand side is lower than the one at the right hand side, for instance because the desired motion envelope demands this. The "platform" for that matter can also be formed differently, for instance as a dish part which is located partly under the plane formed by at least three first couplings.

In FIG. 2, a first position is shown of the first couplings C1-C6 and the second couplings G1-G6. The first couplings C1, C2 form a first pair 5 of first couplings, the couplings C3 and C4 a second pair 6 of first couplings and the first couplings C5 and C6 a third pair 7 of first couplings. The second couplings G1 and G2 form a first pair 8 of second couplings, the second couplings G3 and G4 form a second pair 9 of second couplings and the couplings G5 and G6 a third pair 10 of second couplings. The first pair 5 and second pair 6 of first couplings are located on a first circle 11, the third pair 7 on a second circle 12. The first and second circle 11, 12 are concentric with a centre M between the pairs 5-7 mentioned. The first circle 11 has a first radius $R_1$, the second circle 12 a smaller, second radius $R_2$. Through the third pair 7 of first couplings C5, C6 and the centre M of the circles 11, 12, a first line $L_1$ extends, through the centre M, at right angles to the first line $L_1$, a second line K. From the centre M, two second lines $L_2$ each extend at an angle α relative to the line K through the centre of the first and second pair, 5, 6, respectively, of first couplings C1, C2 and C3, C4, respectively. The angle α can for instance be 30°, so that between the first and the second line $L_1$, $L_2$, each time, 120° is included, yet also a different, smaller or larger angle can be involved.

Further, in FIG. 2, a third circle 13 and, concentric therewith, a fourth circle 14 have been drawn, which have a centre $M_2$ which is off-set relatively to the centre M of the first and second circle. On the fourth circle, the third pair 10 of second couplings G5, G6 is located, on each side of a third line $L_3$ one second coupling G5, G6. The third line $L_3$ extends parallel to the first line $L_1$, through the centre $M_2$. Each time, a second coupling G1 and G4, respectively, of the first and second pair 8, 9 of second couplings is located on the third circle 13. Moreover, the first pair 8 is on a straight line $V_3$, which includes an angle γ with a tangent T at the third circle 13 at the location of the second coupling $G_1$ located on the third circle. In a similar manner, the second couplings $G_3$ and $G_4$ lie on a straight line $V_4$, which also includes an angle γ with a tangent at the circle 13 at the location of coupling $G_4$. In this embodiment, the second couplings $G_2$, $G_3$ are outside the third circle 13, but they could also lie inside it. Due to a suitable angle γ, the legs 4, connected to the first and second pairs 8, 9 of second couplings, respectively, are prevented from coming into contact with each other upon movement of the platform.

It will be clear that the centres M and M2 can also coincide, at least can be off-set relatively to each other in the plane of the drawing or in a different manner.

FIG. 3 shows an alternative embodiment, wherein only first couplings C1-C6 are shown. In this embodiment, a first and second pair 5, 6 of first couplings C1, C2 and C3, C4, respectively, are located on a relatively large, second ellipse E2, while the third pair 7 of first couplings C5, C6 is located on a first ellipse E1. The first ellipse E1 has a major axis L1 which extends through a centre M and between the first couplings C5, C6. The second ellipse has a major axis K which extends at right angles to the major axis L1 of the first ellipse E1, parallel to the minor axis K1 thereof. The minor axis K1 of the first ellipse E1 is at a distance D from the major axis K of the second ellipse E2. The first and second pair 5, 6 is adjusted at an angle α to the major axis K, at the side thereof remote from the third pair C5 C6. The first couplings C1, C4 are then on a first, largest circle 13, the first couplings C2, C5, C6 and C3 on a smaller second circle 14. The first and second circle 13, 14 have only been partly drawn and are located concentrically with a centre M3 above the centres M, M2 of the first and second ellipse E1, E2. Subsequently, FIG. 4 shows a third embodiment wherein each time a first coupling C1, C4, respectively, of a first pair 5 and a second pair 6 of first couplings is located on a circle 13, while the third pair 7 of first couplings C5, C6 is located on the smaller circle 14, concentric therewith. The first couplings C1 and C2 of the first pair 5 are located on a straight line V1, which includes an angle γ with a line L2 through the respective first coupling C1 of the respective pair located on the first circle and the line L2 extending through the centre M. The line L2 includes an angle α with the line K through the centre M, at right angles to the line L1 through the centre and the third pair 7. The advantages of such an arrangement have already been discussed in relation to the second couplings G1-G4 of FIG. 2.

In FIG. 5, an envelope is drawn of a motion simulator 1 according to the invention, wherein the motion envelope B is indicated with squares W which define an outer surface of the motion envelope B and, at least for the greater part, enclose a cube Z. The cube Z is drawn in and indicates the cube-shaped target function which, ideally, should be enclosed by the motion envelope (workspace). In this drawing, the angles of the cube Z indicate a specific prerequisite for approximately 18° pitch, 15° roll and 20° yaw, which occur simultaneously in conformity with the standard Euler angles psi, theta and phi of yaw, pitch and roll, respectively, of the platform relative to the fixed world. It will be clear that in the same or comparable manner for other angles for pitch, roll and yaw, comparable cubes Z with motion envelopes B can be determined. On the other hand, starting from predetermined real or theoretic values for the desired angles for roll pitch and yaw, each time, a workspace can be determined on the basis of which it can be calculated in what manner the location of the different first and second couplings C1 C6, G1-G6 and the length and adjustability of the different legs 4 is to be determined.

As is clearly shown in FIG. 1, the first couplings C and second couplings G are located at different levels N, to which end the couplings, designed as ball and socket joints, are each time included, pair-wise, in housings 20, in which housings the pairs 5, 6, 7 of first couplings C1, C2; C3, C4; C5, C6 or pairs 8, 9, 10 of second couplings G1, G2; G3, G4; G5, G6 are received. Preferably, each time, the housings 20 are identical and designed in a manner known per so, while, nonetheless, means are provided for adjusting at least one of the couplings C, G, respectively, received within the respective housing, relative to the other coupling C, G, respectively, received therein. In this manner, a particularly simple construction is obtained while a large freedom for setting is achieved.

It is advantageous if one or more couplings C, G is movably arranged. For instance, in FIG. 1, the coupling C1 at the platform 3 and the coupling G5 on the base 2 are settable for height with the aid of a suitable adjustment mechanism 20, for instance a screw spindle or a piston cylinder assembly. Herewith, the position of the respective coupling C, G, relative to the platform 3 and the basis 2, respectively, can be adjusted, preferably actively, during use of the platform as well as in between two situations of use. Both individual couplings and pairs of couplings can be adjustable, for instance by moving the housings. Due to such adjustability, a motion apparatus can be adjusted to a new simulation environment rapidly and in a simple manner, for instance to a different vehicle to be simulated or a different situation of use, for instance from the approach of an airplane to taxiing after landing. When used as robot platform, adjustment in a rapid and simple manner to a new condition of use, for instance a different product to be processed or a different operation is possible.

The invention is not limited in any manner to the exemplary embodiments represented in the drawing. Many variations thereon are possible within the framework of the invention outlined by the claims.

For instance, differently shaped platforms 3 and/or base plates 2 can be used within the invention, while all sorts of other couplings can be used. The cube Z aimed at for, for instance, rotations, can also be orientated in space differently, while the surrounding envelope B can be moved along by adjusting the position of the first couplings C, the second couplings G and/or the length and/or the adjustability of the legs 4, Precisely because not all first couplings C and second couplings G are located on a circle or ellipse, a larger adjustment range, at least a better fitting envelope B is obtained, so that a better simulation is possible. Moreover, as a result, the legs ran be arranged such that particularly high accelerations are possible and/or relatively low forces can occur.

These and many comparable variations are understood to fall within the scope of the invention outlined by the claims.

The invention claimed is:

1. A motion simulator comprising a platform carried by three successive pairs of adjacent length-adjustable legs, with each pair having two different ones of the legs, wherein a connection between each of the legs and the platform comprises a first coupling so as to define a plurality of first couplings used across all of the legs, a distance between the first couplings for one of the pairs of the legs is smaller than a distance between the first couplings for each of the other pairs of the legs, and two of the first couplings are located on a first circle and two further ones of the first couplings are located on a second circle with the first and the second circles being concentric with each other and each of said first and second circles having a different respective radius.

2. The motion simulator recited in claim 1 wherein:
   each of the legs is also connected to a base plate via a second coupling so as to define a plurality of second couplings used across all of the legs, one of the second couplings for a first leg of a first one of the pairs of the legs is located closer to a second one of the second couplings of one leg in another given one of the pairs of the legs than to the second coupling for a second leg of said first pair of the legs; and
   two of the second couplings are located on a third circle and two further ones of the second couplings are located on a fourth circle, the third and fourth circles being concentric with each other and each of said third and fourth circles having a different radius.

3. The motion simulator recited in claim 1 wherein the first couplings of two of the pairs of the legs are located on the first circle and the first couplings of the third pair of said legs are located on the second circle.

4. The motion simulator recited in claim 1 wherein:
   the first couplings for a first one of the pairs of legs are located on the first circle; and
   the first couplings for the two other pairs of the legs are located on the second circle.

5. The motion simulator recited in claim 1 wherein:
   the first couplings for a first one of the pairs of legs are located on a first ellipse; and
   the first couplings for the two other pairs of the legs are located on a second ellipse.

6. The motion simulator recited in claim 5 wherein:
   the first ellipse has a first major axis which extends approximately at a right angle to a connecting line between the first couplings for the first pair of the legs;
   the second ellipse has a second major axis extending approximately at a right angle to the major axis of the first ellipse; and
   the first and second major axes intersect off-center.

7. The motion simulator recited in claim 6 wherein the major axis of the first ellipse has a length which is approximately equal to a length of a minor axis of the second ellipse.

8. The motion simulator recited in claim 1 wherein:
the first couplings for a first one of the pairs of the legs are located on the second circle;
the first couplings for each of two further ones of the pairs of the legs are located on a first and a second line, respectively;
a first one of the first couplings, for each of the further ones of the pairs of the legs, is located on the first circle; and
the first and second lines include an angle with a tangent on the first circle containing the first couplings located thereon.

9. The motion simulator recited in claim 1 wherein different ones of the first couplings are located at different heights relative to the platform, and the platform extends approximately horizontally.

10. The motion simulator recited in claim 2 wherein the second couplings for two of the pairs of the legs are located on the third circle and the second couplings of a third pair of the legs are located on the fourth circle.

11. The motion simulator recited in claim 2 wherein the second couplings for a first one of the pairs of the legs and one of the second couplings for each of two other ones of the pairs of the legs are located on the third circle, and another one of second couplings for each of the two other pairs of legs are located on the fourth circle.

12. The motion simulator recited in claim 2 wherein the second couplings for the first pair of legs are located on a third ellipse and the second couplings for the two other pairs of legs are located on a fourth ellipse.

13. The motion simulator recited in claim 12 wherein:
the third ellipse has a third major axis which extends at approximately a right angle to a connecting line between the second couplings for the first pair of the legs;
the fourth ellipse has a fourth major axis which extends at approximately a right angle to the major axis of the third ellipse; and
the third and fourth major axes intersect off-center.

14. The motion simulator recited in claim 13 wherein the major axis of the third ellipse has a length which is approximately equal to a length of a minor axis of the fourth ellipse.

15. The motion simulator recited in claim 2 wherein:
the second couplings for the first pair of the legs are located on the fourth circle;
the second couplings for each of two further ones of the pairs of legs are located on third and fourth lines, respectively;
a first one of the second couplings for each one of two further pairs of the legs is located on the third circle; and
the third and fourth lines include an angle with a tangent on the third circle containing the second couplings located thereon.

16. The motion simulator recited in claim 2 wherein different ones of the second couplings are located at different heights relative to the base plate.

17. The motion simulator recited in claim 1 wherein two ones of the first couplings are included in one joint holder, wherein a distance between said two ones of the first couplings is adjustable in a direction oriented approximately at a right angle to the platform.

18. The motion simulator recited in claim 1 wherein length and adjustability of the legs is chosen such that a specific location on the platform has a pre-defined substantially block-shaped motion envelope.

19. The motion simulator recited in claim 2 wherein two ones of the second couplings are included in one joint holder, wherein a distance between said two ones of the second couplings is adjustable in a direction oriented approximately at a right angle to the base plate.

* * * * *